United States Patent [19]

Mills et al.

[11] 3,864,171
[45] Feb. 4, 1975

[54] ELECTROCHEMICAL CELLS

[75] Inventors: Terence Mills, Basingstoke; Marian Wiacek, Baughurst; Peter James Gillespie, Basingstoke; Clive Douglas Hatcher, Reading, all of England

[73] Assignee: Energy Conversion Limited, Basingstoke, Hampshire, England

[22] Filed: Aug. 22, 1972

[21] Appl. No.: 282,696

[30] Foreign Application Priority Data
Sept. 14, 1971  Great Britain ................. 42705/71

[52] U.S. Cl. ........................ 136/107, 136/134
[51] Int. Cl. .................................. H01m 21/00
[58] Field of Search ............... 136/107, 102, 134

[56] References Cited
UNITED STATES PATENTS

| 3,510,358 | 5/1970 | Nabiullin | 136/107 |
| 3,530,496 | 9/1970 | Amano et al. | 136/107 X |
| 3,630,783 | 12/1971 | Przybyla | 136/107 |
| 3,660,168 | 5/1972 | Ralston | 136/107 |
| 3,663,301 | 5/1972 | Ralston | 136/107 |
| 3,738,869 | 6/1973 | Zaleski | 136/107 X |
| 3,740,271 | 6/1973 | Jammet et al. | 136/107 |

Primary Examiner—Winston A. Douglas
Assistant Examiner—C. F. Lefevour
Attorney, Agent, or Firm—Morgan, Finnegan, Durham & Pine

[57] ABSTRACT

An electrochemical cell including a current collector which extends between end caps of the cell so as to impart structural rigidity to the cell. The current collector may extend through an apertured anode of the cell and engage the anode so as to serve as its current collector.

11 Claims, 9 Drawing Figures

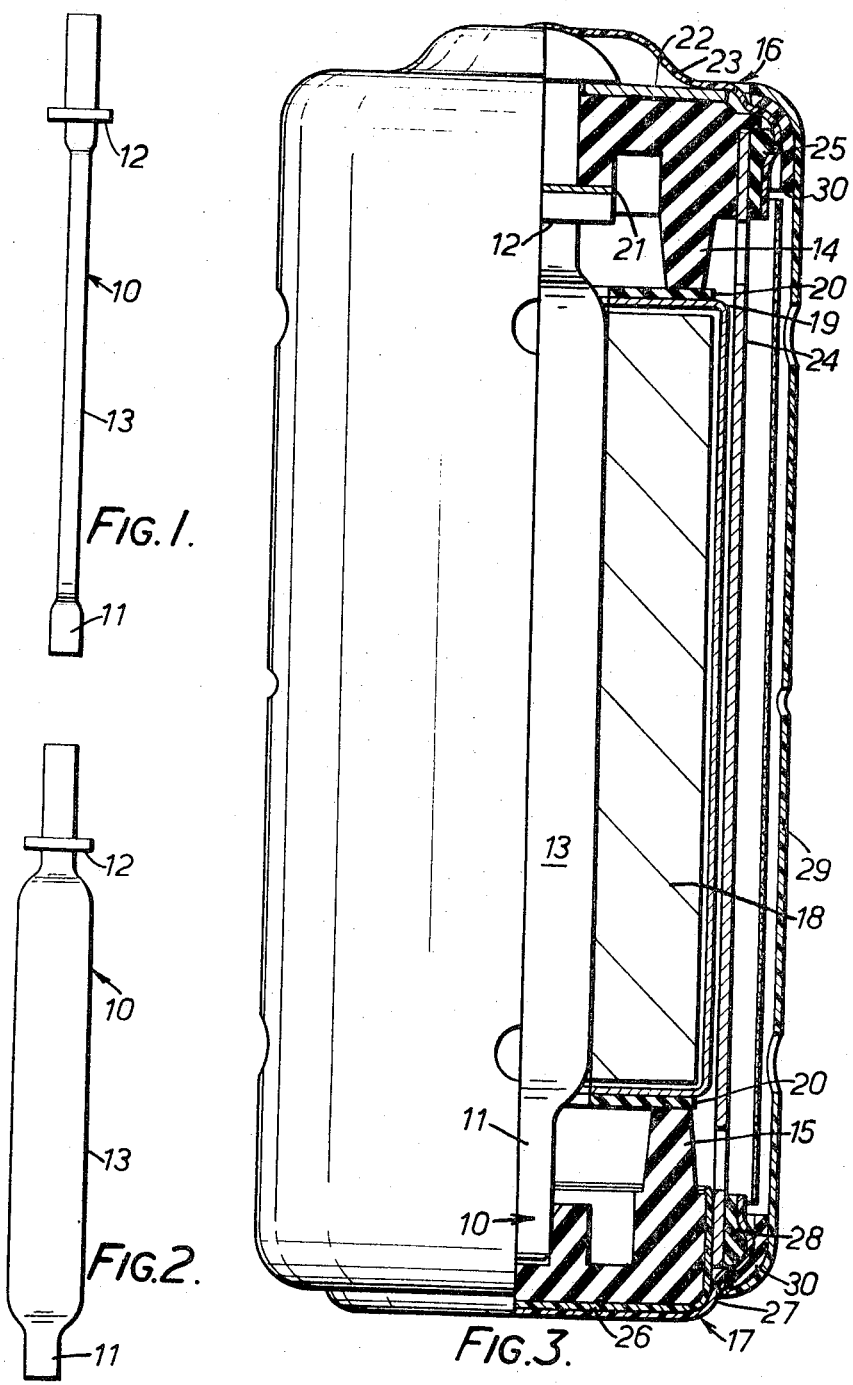

ELECTROCHEMICAL CELLS

The invention relates to electrochemical cells and more particularly to gas depolarised cells such as metal/oxygen cells.

According to one aspect of the invention a gas depolarised cell includes a current collector which extends between end caps of the cell in such manner as to impart structural rigidity to the cell.

Preferably the current collector extends through an apertured anode of the cell and engages the anode so as to serve as the current collector therefor.

The current collector may be formed from a metal rod having flattened portions to engage the anode. Alternatively the current collector may be formed with a generally triangular or rectangular transverse cross-section over at least a portion of its length to engage the anode.

The anode may comprise at least two longitudinally extending portions with an electrically conductive member sandwiched between such portions and attached or otherwise electrically connected to the current collector.

The current collector may carry at least one member which is arranged to engage the inner surface of the anode. The member(s) may be resiliently urged into engagement with the inner surface of the anode. At least one of the end caps may include an electrically insulating spacer member for locating the anode longitudinally in the cell, the spacer member also including a portion which extends into the apertured anode to impart transverse support thereto.

A flange may be formed adjacent one end of the current collector to facilitate sealing of a passage through a portion of one end cap, through which passage said one end of the current collector extends to provide electrical connection to said one end cap. Said passage may be sealed by a washer of a hydrophobic material, such as polytetrafluoroethylene, interposed between said flange and said portion of said one end cap.

The outer end of said one end of the current collector may be rivetted welded or soldered to a further portion of said one end cap to maintain it mechanically and electrically connected thereto.

Alternatively the outer end of said one end of the current collector may be attached to said one end cap by passing a slotted washer with a smaller diameter opening than the current collector diameter over the current collector end so as to deform the washer and retain it over such current collector end.

The foregoing and further features of the invention may be more readily understood from the following description of some preferred embodiments thereof, by way of example, with reference to the accompanying drawings, in which:

FIG. 1 is a side elevational view of a current collector for a gas depolarised cell;

FIG. 2 is a front elevational view of the current collector of FIG. 1;

FIG. 3 is a front elevational view, part in section, of a gas depolarised cell with the current collector of FIGS. 1 and 2 in position in the cell;

An exemplary embodiment of the invention, and modifications thereto, are illustrated in the drawings and will now be described in detail. In the drawings, corresponding elements are designated with corresponding numerical designations.

Figures 4, 5, 6:
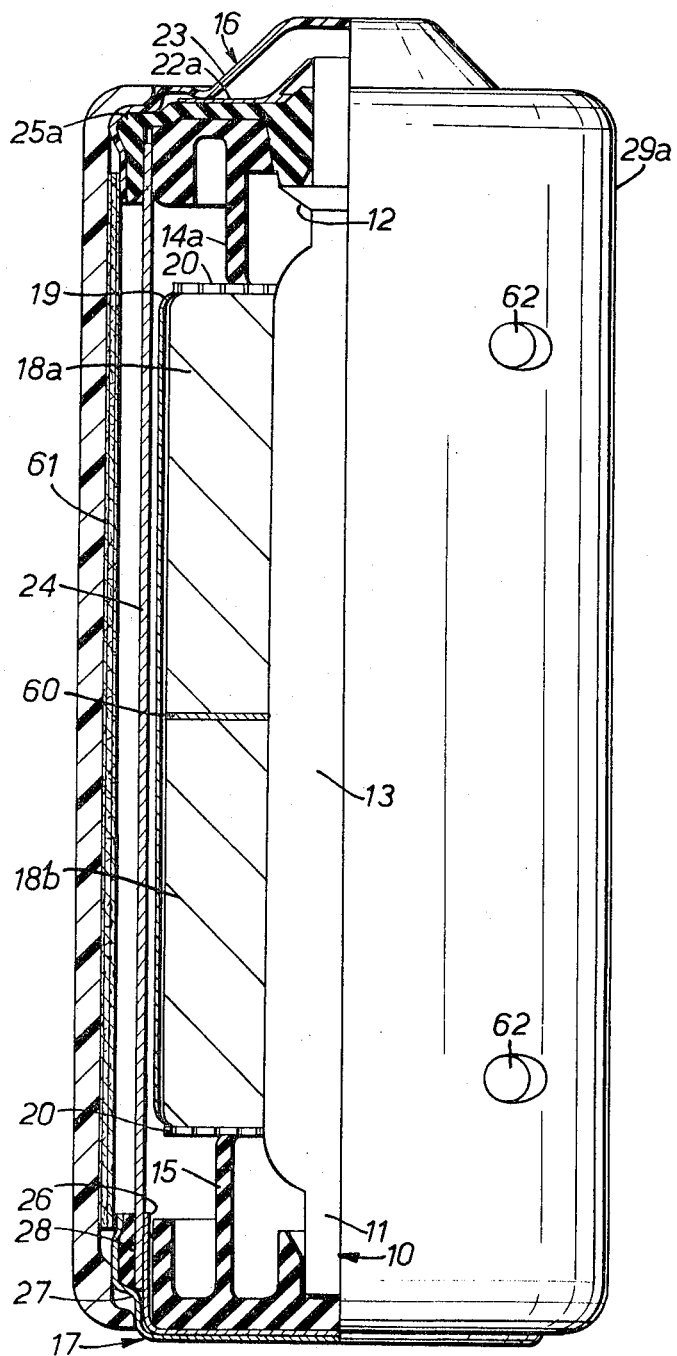
FIG. 4 is a transverse sectional view of an alternative current collector for a gas depolarised cell.
FIG. 5 is a transverse sectional view of a further alternative current collector for a gas depolarised cell.
FIG. 6 is a front elevational view, part in section, of an alternative gas depolarised cell with the current collector of FIGS. 1 and 2 in position in the cell.

Referring now firstly to FIGS. 1 and 2 there is shown a current collector 10 for a gas depolarised N-cell which comprises a copper wire 11 formed with a flange 12 adjacent one end and having a central flattened portion 13.

Referring now to FIG. 3 there is shown a gas depolarised cell with the current collector 10 located in position between electrically insulating spacer members 14 and 15, which form parts of respective end caps 16 and 17, and engaging the inner wall of an apertured anode 18. A separator 19 extends around anode 18 and is held in position by electrically insulating washers 20 at the top and bottom thereof as shown in FIG. 3.

The flange 12 on current collector 10 abuts the surround of a central aperture in spacer 14 and a seal 21 of hydrophobic material may be interposed therebetween to prevent electrolyte passing from the apertured anode 18 to the end cap 16. The end of current collector 10 passes through the central aperture in spacer 14 and is rivetted to hold a metal washer 22 thereto. An outer end cap member 23 is crimped or otherwise fixed to complete the end cap assembly 16 and locates a cathode 24 at one end to spacer 14 with a seal 25 interposed therebetween. Current connection is thus provided from the anode 18 via current collector 10 to outer end cap member 23 directly via the rivetted end of current collector 10, and via the washer 22 which is in engagement both with current collector 10 and outer end cap member 23.

The other end of current collector 10 engages in a central, closed aperture in spacer 15 so as to provide a strengthening member for the whole cell. End cap 17 comprises two cup-shaped members 26 and 27 which surround spacer 15. The inner member 26 abuts spacer 15 and the other end of cathode 24 is held thereagainst by member 17 being crimped or spun over with a seal 28 interposed therebetween. Current collection from the cathode 24 is thus achieved by the direct connection thereof with the member 26 of end cap 17.

The cell is completed by an apertured outer case 29 which is crimped or spun over at the two end caps 16 and 17 with insulating spacers 30 interposed therebetween.

FIGS. 4 and 5 show alternative transverse cross-sections of current collector which could replace the portion 13 of current collector 10. The FIG. 4 arrangement includes a triangular cross-sectional portion 40 and FIG. 5 has a cross-section 50 in the form of three cusps equidistantly spaced.

The requirement for the central portion of any current collector is that it should have longitudinal, structural strength and yet allow free access of electrolyte to the anode.

Referring now to FIG. 6 there is shown a gas depolarised N-cell similar to that illustrated in FIG. 3. In this cell the spacer 14a is of a different shape to accommodate a modified seal 25a which extends from around the end of current collector 10 to adjacent the outer periphery of the cell. The washer 22a is formed of spring steel, has a central aperture smaller than the diameter of the end of current collector 10 and is formed with radial slots. In assembling the cell the end cap member 23, with the washer 22a spot welded in it, is forced down with a press tool, whilst the bottom of the cell is supported. Hence the washer 22a is deformed when it passes around the end of the current collector 10 and is so retained from being removed from such current collector 10. The fact that the current collector 10 extends completely through the cell thus facilitates this much simplified mass production assembly technique as well as imparting structural rigidity to the finished cell. An adhesive may be applied to the portion of the current collector which passes through seal 25a and around washer 22a to assist in sealing. Instead of flange 12, the current collector portion which extends through seal 25a could be tapered to assist sealing.

A further difference in the cell of FIG. 6 is that the anode 18 is formed as two separate longitudinal halves 18a and 18b with a copper washer 60 sandwiched between them. The copper washer is a force fit over the central portion 13 of the current collector 10 to make electrical connection therewith and so provide additional current collection connection with the anode 18.

The outer case 29a is formed of synthetic plastics material and hence the insulating spacers 30 of the FIG. 3 arrangement are dispensed with.

A cylindrical member 61 of absorbent material, such as blotting paper, is located inside the outer case 29a so as to absorb any small amounts of electrolyte should a leak develop in the cell. This member 61 also serves to diffuse depolarising gas entering through access apertures 62 in outer case 29a.

Figure 7:
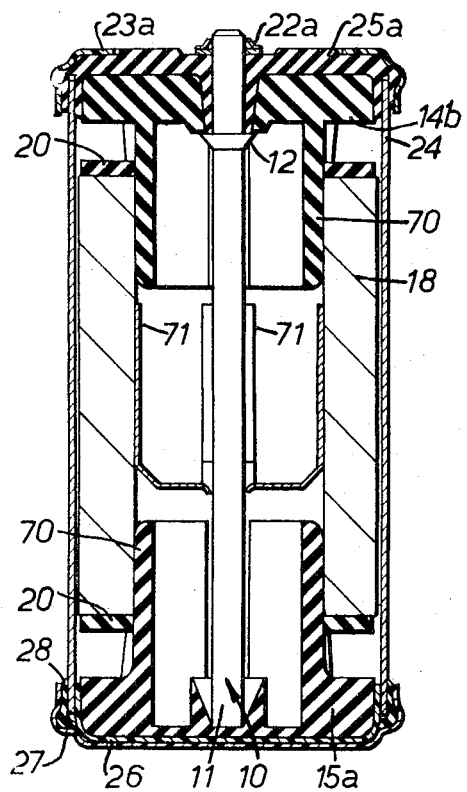
FIG. 7 is a side sectional view of a further gas depolarised cell.

Referring now to FIG. 7 there is shown a gas depolarised D-cell which is similar in general layout to the cells of FIGS. 3 and 6. In this cell the electrically insulating spacers 14b and 15a not only locate and support the anode 18 longitudinally but also have annular nose portions 70 which extend into the central aperture in anode 18 to provide transverse support therefor. Further the washers 20 are supported by members 14b and 15a closely adjacent the central apertures in such washers 20 so that should there be any swelling of anode 18 the washers 20 can deform and allow such swelling without damage to the cell.

Alternatively the nose portions 70 could be extended to abut one another and be coated with electrically conductive material so as to act as the current collector. The member 10 would then not extend between the end caps but be provided at the upper end only and connected to the coating.

The current collector 10 is of uniform circular cross-section along its complete length apart from flange 12. The current collector 10 carries two U-shaped members 71 of eletrically conductive material which are a force fit on current collector 10 in similar manner to washer 22a. The arms of members 71 are sprung outwardly to abut the inner surface of anode 18 for current collection therefrom.

In this embodiment the outer case 29 is omitted and the end cap member 23a is annular to leave the end of current collector 10 exposed. The cell shown is intended to be used with other similar cells in a box to form a battery of such cells. Alternatively a full end cap and outer case could be provided for utilising the cell alone.

Figure 8:
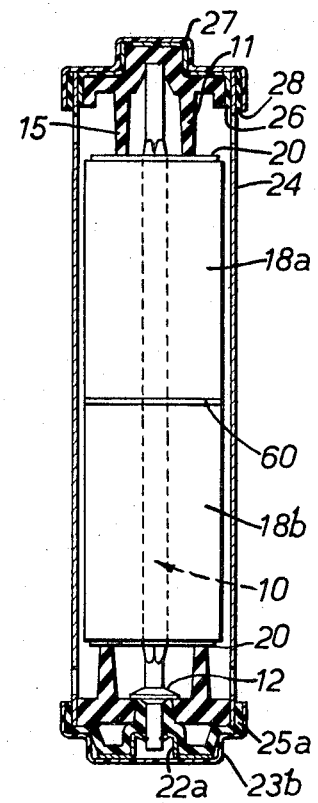
FIG. 8 is a side sectional view of a still further gas depolarised cell.
Figure 9:
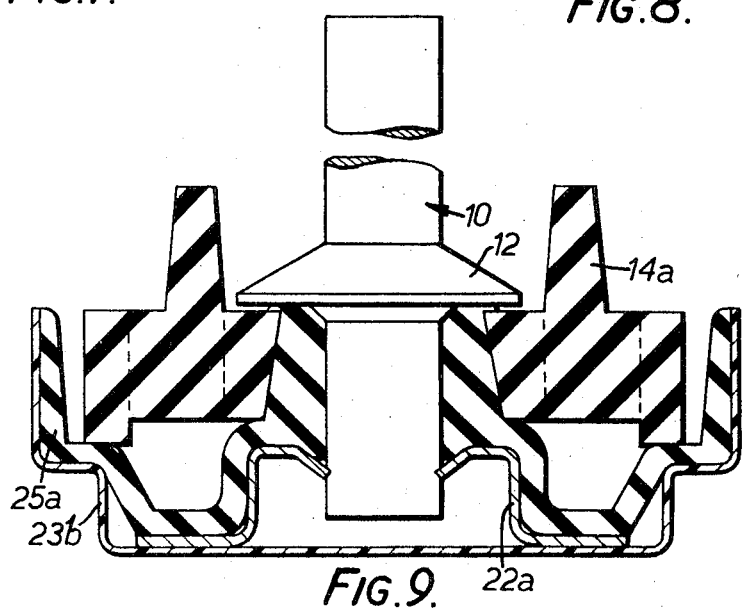
FIG. 9 is a side sectional view, on enlarged scale, of the lower end cap of the cell of FIG. 8.

Referring finally to FIGS. 8 and 9 there is shown a gas depolarised AA-cell of similar construction to the cells of FIGS. 3 and 6 inverted, i.e., the "pip" or protruding electrical contact being connected to the cathode so as to be of positive potential rather than to the anode to be of negative potential. In this embodiment the current collector 10 is of triangular cross-section where it extends through the anode and carries a copper washer 60 sandwiched between anode halves 18a and 18b as in the FIG. 6 cell. A further washer (not shown) may be provided at each end of the anode. The current collector 10 may alternatively be of circular cross-section along its complete length with the washers being a force fit as with the washer 22a.

The cells illustrated can be utilised as a metal/air cells in which the anodes 18 comprise compacted porous zinc, the cathodes 24 comprise a catalyst of silverised graphite carried on a nickel current collector with a hydrophobic layer on its outer surface, and the electrolyte comprises an aqueous solution of potassium hydroxide.

It has been found that cells utilising current collectors as illustrated in FIGS. 1 to 3 give increased capacity to the cells as compared with cylindrical and other forms of current collector as well as adding structural strength to the cells in the longitudinal direction. The increased capacity of such cells is borne out by the experimental data given below for two comparative sets of ten cells.

COMPARISON OF CELLS DISCHARGED AT 100 mA.
(TYPICAL RESULTS)

| HOURS RUN BEFORE CELL VOLTAGE DROPS TO 0.8V | |
|---|---|
| 1/16" DIA PLAIN CURRENT COLLECTOR | IMPROVED FLATTENED CURRENT COLLECTOR |
| 12.7 | 15.8 |
| 13.1 | 14 |
| 12.3 | 15 |
| 12.6 | 14.9 |
| 12.9 | 15.3 |
| 12.8 | 15.6 |
| 13.6 | 14.1 |
| 12.1 | 15 |
| 12.2 | 15.1 |
| 13 | 14.6 |
| AVERAGE: 12.7 | 14.9 |

It will be noted from the table above that the current collector of the invention gives 17% increase in operation time for the cell.

We claim:
1. A gas depolarized cell comprising:
   a. a tubular apertured anode electrode;
   b. a separator extending around and adjacent the outer surface of said apertured anode electrode;
   c. a tubular cathode electrode adjacent the outer surface of the separator and extending beyond said apertured anode electrode at each end thereof to an associated end cap;
   d. electrolyte at least contained within the separator;

e. a current collector which passes through said apertured anode electrode longitudinally and extends beyond each end thereof to said associated end cap, said current collector being electrically connected to said apertured anode electrode and being located between and in operative contact with the end caps in the form of a strut whereby longitudinally rigidity is imparted to the cell.

2. A gas depolarized cell as claimed in claim 1, wherein the current collector comprises a metal rod having flattened portions to engage the anode.

3. A gas depolarized cell as claimed in claim 1, wherein the current collector has a generally triangular transverse cross-section over at least a portion of its length which engages the anode.

4. A gas depolarized cell as claimed in claim 1, wherein the anode comprises at least two longitudinally extending portions with an electrically conductive member sandwiched between such portions and electrically connected to the current collector.

5. A gas depolarized cell as claimed in claim 1, wherein the current collector comprises at least one member of electrically conductive material arranged so as to engage the inner surface of the anode.

6. A gas depolarized cell as claimed in claim 1, wherein one of said end caps defines a passage therein; the associated end of the current collector extends into said passage and has a flange therein; and a sealing member interposed between said flange and the end cap, whereby said passage is sealed.

7. A gas depolarized cell as claimed in claim 6, wherein said sealing member is a washer of hydrophobic material.

8. A cell as claimed in claim 5, wherein said at least one member of electrically conductive material is resiliently urged into engagement with the inner surface of the anode.

9. A gas depolarized cell as claimed in claim 5, wherein at least one of the said end caps comprises an electrically insulating spacer member for locating the anode longitudinally in the cell, said spacer member having a portion which extends into the apertured anode so as to impart transverse support thereto.

10. A gas depolarized cell as claimed in claim 6, wherein the outer end of said extending end of the current collector is riveted to a further portion of said one end cap whereby mechanical and electrical connection between said extending end of the current collector and said further portion of said end cap is maintained.

11. A gas depolarized cell as claimed in claim 6, wherein the outer end of said one end of the current collector is attached to said one end cap by a slotted washer positioned over the current collector, said washer having a smaller diameter opening than the diameter of the current collector so that said positioning deforms the washer so as to retain it over said current collector end.

* * * * *